US008775936B2

(12) United States Patent
Massaro et al.

(10) Patent No.: US 8,775,936 B2
(45) Date of Patent: Jul. 8, 2014

(54) DISPLAYING DYNAMIC AND SHAREABLE HELP DATA FOR IMAGES A DISTANCE FROM A POINTED-TO LOCATION

(75) Inventors: Timothy J. Massaro, Mazeppa, MN (US); Karen E. Paone, Rochester, MN (US); Allen J. Ziolkowski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/324,022

(22) Filed: Dec. 13, 2011

(65) Prior Publication Data
US 2013/0151964 A1 Jun. 13, 2013

(51) Int. Cl.
*G06F 3/048* (2013.01)

(52) U.S. Cl.
USPC ............ 715/711; 715/708; 715/856; 715/862

(58) Field of Classification Search
USPC .................. 715/705, 708, 711, 715, 856, 862
See application file for complete search history.

(56) References Cited

U.S. PATENT DOCUMENTS

| 5,546,521 | A | 8/1996 | Martinez |
| 7,346,846 | B2 | 3/2008 | Rossi, Jr. et al. |
| 7,480,863 | B2 | 1/2009 | Branson et al. |
| 7,533,341 | B2 | 5/2009 | Ko |
| 2005/0091096 | A1* | 4/2005 | Coates et al. ..................... 705/8 |
| 2005/0091576 | A1* | 4/2005 | Relyea et al. ................. 715/502 |
| 2005/0138559 | A1 | 6/2005 | Santos-Gomez et al. |
| 2006/0259503 | A1* | 11/2006 | Bradateanu et al. .......... 707/102 |
| 2007/0162898 | A1* | 7/2007 | Ramani et al. ................ 717/135 |
| 2009/0132919 | A1* | 5/2009 | Allen et al. ................... 715/708 |

* cited by examiner

*Primary Examiner* — Xiomar L Bautista
(74) *Attorney, Agent, or Firm* — Owen J. Gamon

(57) ABSTRACT

A controller is provided that provides help for applications, wherein the controller is different from all of the applications. The controller receives a command and identifies a location that a user was pointing to on a display device when the command was received. The controller finds on the display device, a first image within a predefined distance of the location where the user was pointing to on the display device when the command was received. The controller determines an identity of an application that generated the first image. The controller searches for help data based upon the identity of the application that generated the first image and based on the first image. The controller displays the help data if the searching finds the help data assigned to the first image and the application that generated the first image.

16 Claims, 6 Drawing Sheets

HELP REPOSITORY 142

| IMAGE 320 | APPLICATION ID 322 | HELP DATA 324 | |
|---|---|---|---|
| X | APPLICATION A | ADDRESS B | 302 |
| (canoe icon) | APPLICATION C | CANOE AVAILABLE HERE | 304 |
| (telephone icon) | APPLICATION B | CLICK TELEPHONE TO MAKE A CALL | 306 |
| (monitor icon) | APPLICATION B | SEND TO AUXILIARY MONITOR | 308 |
| CANOE TYPE 1 | APPLICATION C | CANOE TYPE 1 IS A FIBERGLASS CANOE SUITABLE FOR TWO PEOPLE | 310 |
| CANOE TYPE 2 | APPLICATION C | CANOE TYPE 2 IS AN ALUMINUM CANOE SUITABLE FOR THREE PEOPLE | 312 |
| CANOE TYPE 3 | APPLICATION C | CANOE TYPE 3 IS A KEVLAR CANOE SUITABLE FOR FOUR PEOPLE | 314 |

FIG. 3

DISPLAYING DYNAMIC AND SHAREABLE HELP DATA FOR IMAGES A DISTANCE FROM A POINTED-TO LOCATION

FIELD

An embodiment of the invention generally relates to computer systems and more particularly to computer systems that provide help data.

BACKGROUND

Computer systems typically comprise a combination of computer programs and hardware, such as semiconductors, transistors, chips, circuit boards, storage devices, and processors. The computer programs are stored in the storage devices and are executed by the processors.

Computer programs often provide a user interface, through which users interact with the programs. The user interface may be a command line user interface or a graphical user interface (GUI). The user interface allows the user to send commands and parameters to the computer programs. Providers of computer programs often deliver the programs to users with little or no printed manuals or documentation. Instead, users discover the available commands and the meaning of the commands and parameters by interacting with the user interface of the program and by requesting help information from the programs. The help information is often hard coded into the programs and provided to the users on demand.

SUMMARY

A method, computer-readable storage medium, and computer system are provided. In an embodiment, a controller is provided that provides help for a plurality of applications, wherein the controller is different from all of the plurality of applications. The controller receives a command and identifies a location that a user was pointing to on a display device when the command was received by the controller. The controller finds, on the display device, a first image within a predefined distance of the location where the user was pointing to on the display device when the command was received. The controller determines an identity of an application that generated the first image from among the plurality of applications. The controller searches for help data based upon the identity of the application that generated the first image and based on the first image. The controller displays the help data if the searching finds the help data assigned to the first image and the application that generated the first image.

BRIEF DESCRIPTION OF THE SEVERAL VIEWS OF THE DRAWINGS

FIG. 3 depicts a block diagram of an example data structure for a help repository, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
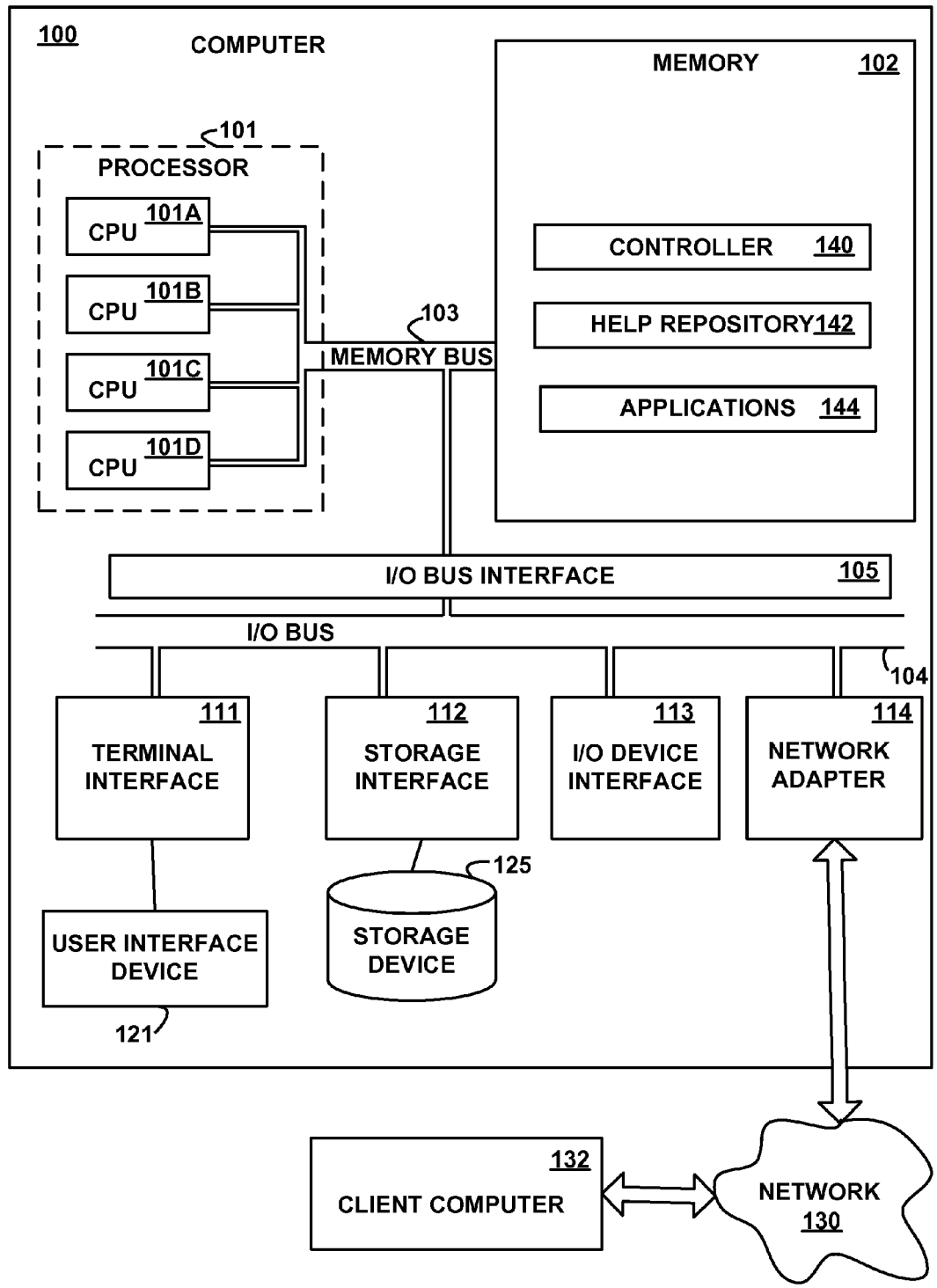
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a controller 140, a help repository 142, and applications 144. Although the controller 140, the help repository 142, and the applications 144 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 140, the help repository 142, and the applications 144 are illustrated as being contained within the main memory 102, these elements are not necessarily all completely contained in the same storage device at the same time. Further, although the controller 140, the help repository 142 are illustrated as being separate entities, in other embodiments some of them, portions of some of them, or all of them may be packaged together.

In an embodiment, the controller 140 and/or the applications 144 comprise instructions or statements that execute on the processor 101 or instructions or statements that are interpreted by instructions or statements that execute on the processor 101, to carry out the functions as further described below with reference to FIGS. 2, 3, 4, 5, and 6. In another embodiment, the controller 140 and/or the application 144 are implemented in hardware via semiconductor devices, chips, logical gates, circuits, circuit cards, and/or other physical hardware devices in lieu of, or in addition to, a processor-based system. In an embodiment, the controller 140 and/or the applications 144 comprise data in addition to instructions or statements. In various embodiments, the applications 144 are user applications, third-party applications, operating systems, or any portion, multiple, or combination thereof. In an embodiment, the controller 140 is separate from, different, and developed by a different organization or company than the applications 144.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user interface devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user interface device 121 and the computer system 100, and may receive output data via the user output devices. For example, a user interface may be presented via the user interface device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
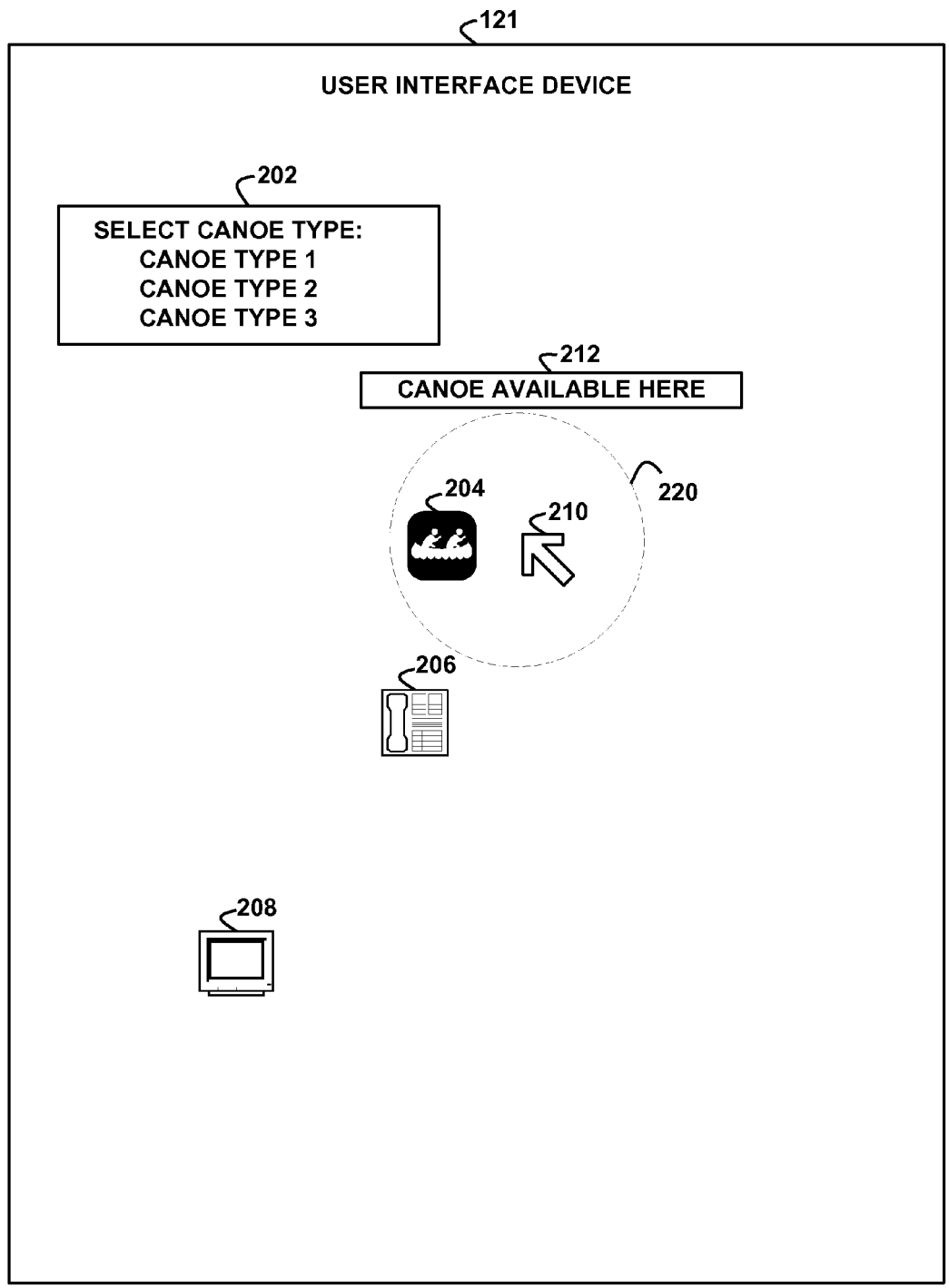
FIG. 2 depicts a block diagram of an example user interface device, according to an embodiment of the invention.

FIG. 2 depicts a block diagram of an example user interface displayed on a display device of the user interface device 121, according to an embodiment of the invention. The user interface illustrates example images 202, 204, 206, and 208 generated via various of the applications 144. The images 202, 204, 206, and 208 may be generated by the same or different of the applications 144 and may be displayed within a window or windows generated by the applications 144. In various embodiments, an image may be implemented as an icon, a display screen region, a symbol, a widget, an expression, a screen segment, a label, text, a help region, or any multiple or combination thereof. In various embodiments, generating an image comprises displaying the image on a display device of the user interface device 121, either directly or indirectly, using functions of an operating system and/or device drivers. The user interface further illustrates example help data 212, which the controller 140 displayed in response to a help command received from a user via the user interface device 121 and in response to determining that the image 204, to which the help data 212 is assigned, was displayed within a predetermined proximate distance from the pointer 210, as represented by the radius of the circle 220 from the location of the pointer 210 on the display device of the user interface device 121.

FIG. 3 depicts a block diagram of an example data structure for a help repository 142, according to an embodiment of the invention. In various embodiments, the help repository 142 may be implemented as a database, a file, an object, registers, or memory locations. The help repository 142 comprises example records 302, 304, 306, 308, 310, 312, and 314, each of which comprises an example image field 320, an application ID (identifier) field 322, and a help data field 324.

The image field 320, in each record, identifies, specifies, stores, or comprises an image or an address of an image. The application identifier field 322, in each record, identifies one of the applications 144 that generates the image in the image field 320, in the same record. The help data field 324 identifies, specifies, stores or comprises help data that is assigned to the image identified in the image field 320, in the same record. In various embodiments, the help data may comprise text, graphics, audio, or video that explains or provides information regarding the meaning of the image, or the meaning of operations or functions that a user may request or perform via the image, in the same record.

In various embodiments, the help data 324 may be provided by a user of the applications via the I/O device 121. The user may obtain the help data 324 from the user's own experience, from other users, team members or department members. The user may purchase or receive the help data from a third party affiliated or unaffiliated with the applications 144. Further the help data 324 may comprise a variety of help from a variety of sources.

Figure 4:
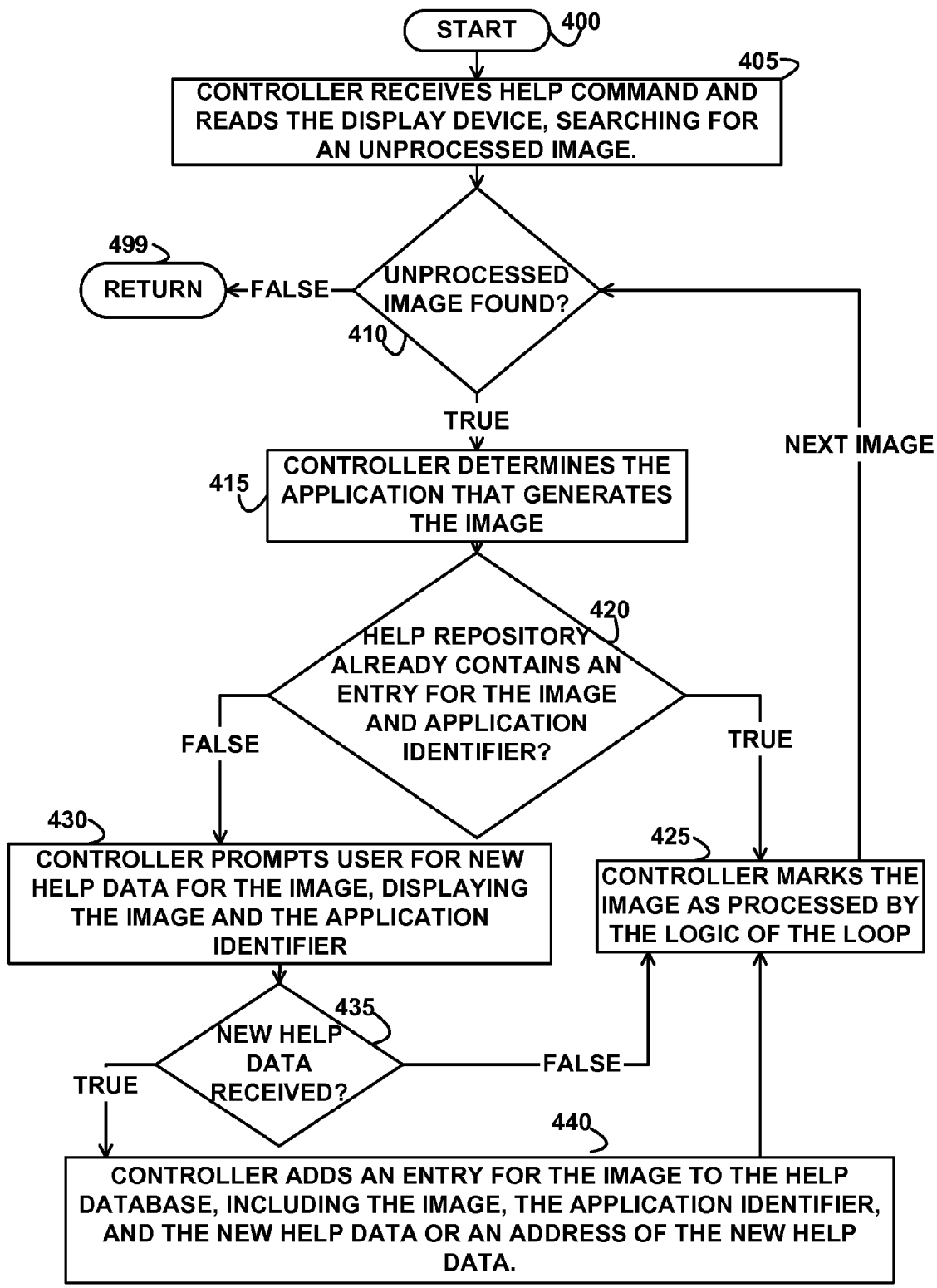
FIG. 4 depicts a flowchart of example processing for an unprocessed-image help command, according to an embodiment of the invention.

FIG. 4 depicts a flowchart of example processing for an unprocessed-image help command, according to an embodiment of the invention. Control begins at block 400. Control then continues to block 405 where the controller 140 receives a help command from the user interface device 121. In various embodiments, the help command may be initiated by the user via a selection of a button on a pointing device, via a touch of a touch screen with a finger or stylus, via a selection of a menu item or option, via a voice command, or any other appropriate mechanism. In response to the help command, the controller 140 reads the contents of data displayed on the display device, searching for an image that has not yet been processed by the logic of FIG. 4. Control then continues to block 410 where the controller 140 determines whether an image exists that is displayed on the display device and has not yet been processed by the loop that starts at block 410 of FIG. 4.

If the determination at block 410 is true, then an unprocessed image exists, so control continues to block 415 where the controller 140 determines the identity of he application, from among all applications, that generates the current image and an identifier of that application. The controller 140 makes the determination by calling an operating system function or by searching a data structure in the memory 101 of images and corresponding applications that generate the images.

Control then continues to block 420 where the controller 140 determines whether the help repository 142 already contains a record for the image and the found application identifier. The controller 140 makes the determination by comparing the current image to the images 320 in the help repository 142 and finding a record comprising a matching image to the current image and reading the application identifier 322 from the same record and comparing the application identifier 322 to the determined application identifier of block 415.

If the determination of block 420 is true, then the help repository 142 already contains a record for the image and the found application identifier, so control continues to block 425 where the controller 140 marks the image as processed by the logic of the loop that starts at block 410. Control then returns to block 410 where the controller 140 determines whether a next unprocessed image is found, as previously described above.

If the determination of block 420 is false, then the help repository 142 does not already contain a record for the image and the found application identifier, so control continues to block 430 where the controller 140 displays the image and the application identifier of the application that generated the image on the user interface device 121 and prompts or asks the user for new help data for the image. In response to the prompt, the user may send new help data to the controller 140. Control then continues to block 435 where the controller 140 determines whether the controller 140 has received new help data from the user via the user interface device 121. If the determination at block 435 is true, then the controller 140 received new help data, so control continues to block 440 where the controller 140 adds a record for the image to the help database, including the image, the application identifier, and the new help data or an address of the new help data. Control then continues to block 425, as previously described above.

If the determination at block 435 is false, then the controller 140 did not receive new help data, so control continues to block 425, as previously described above. If the determination at block 410 is false, then all of the images have been processed by the loop that starts at block 410, so control continues to block 499 where the logic of FIG. 4 returns.

Thus, in an embodiment, the controller 140 prompts for new help data for all images generated by all of the applications 144 that are not already assigned help data and assigns the new help data to the images and the applications 144 that generate the images in the help repository 142.

Figure 5:
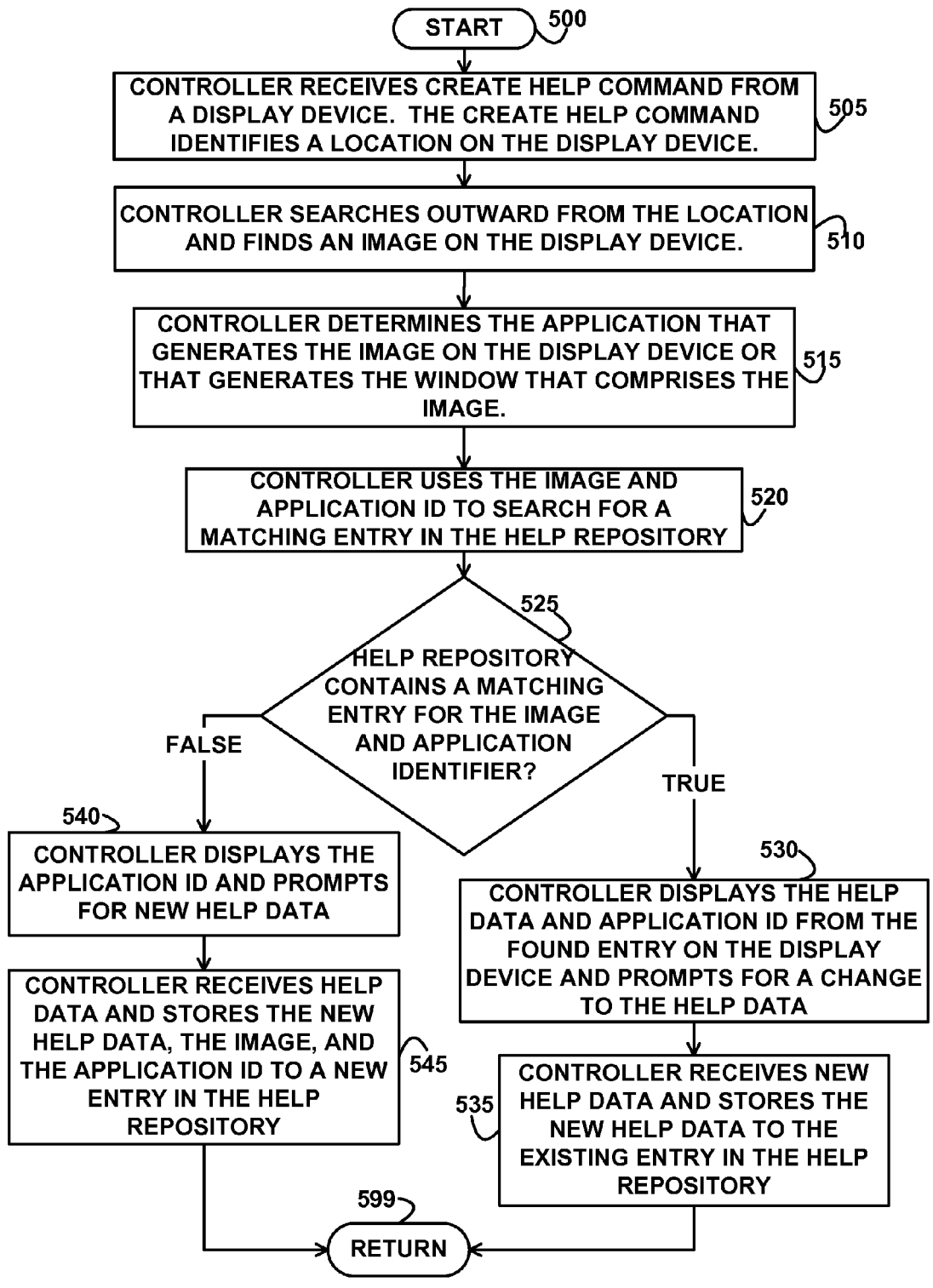
FIG. 5 depicts a flowchart of example processing for a create help command, according to an embodiment of the invention.

FIG. 5 depicts a flowchart of example processing for a create help command, according to an embodiment of the invention. Control begins at block 500. Control then continues to block 505 where the controller 140 receives a create help command from the user interface device 121. The create help command identifies or specifies a location on the display device of the user interface device 121 that the user was pointing to when the controller 140 receives the command. The create help command requests that the controller 140 create help data for an image located within a predefined distance of the location where the user was pointing to on the display device when the command was received. In various embodiments, the user may initiate a create help command by selecting a button on a pointing device while the pointer 210 is positioned at the location on the display device, by touching the display device with a finger, other body part, or a stylus, via a voice command, or by selecting a menu option. In various embodiments the controller 140 receives the predefined distance from the user or an administrator as option, receives the predefined distance from the user interface device 121, receives the predefined distance from the client computer 132 via the network 130, or calculates the predefined distance from the dimensions of the user interface device 121 and the size of the images displayed on the user interface device 121.

Control then continues to block 510 where the controller 140 searches outward from the location of the pointer 210 and determines whether an image exists within the predefined distance from the location. In various embodiments, the controller 140 uses edge-recognition, color changes, and shading variations in the search for an image, by finding the edges of the image where colors and/or shades change or are discontinuous from the background of the image.

In an embodiment, the controller 140 uses a Gaussian smoothed step edge (an error function) to model the discontinuities (the edges) between the image and the background. An example of such a model is illustrated in the formula:

$$f(x) = \frac{I_r - I_l}{2}\left(\text{erf}\left(\frac{x}{\sqrt{2}\,\sigma}\right) + 1\right) + I_l.$$

The one-dimensional image $f$ has an edge at the point $x=0$. At the left side of the edge, the intensity is $$I_l = \lim_{x \to -\infty} f(x),$$

and right side of the edge, the intensity is $$I_r = \lim_{x \to \infty} f(x).$$

The scale parameter $\sigma$ is the blur scale of the edge, and "erf" is the error function.

In various embodiments, the controller 140 uses search-based or zero-crossing based edge detection. In the search-based edge detection, the controller 140 detects edges by first computing a measure of edge strength, such as a first-order derivative expression or gradient magnitude, and then searching for local directional maxima of the gradient magnitude using a computed estimate of the local orientation of the edge, such as the gradient direction. In the zero-crossing based edge detection, the controller 140 searches for zero crossings in a second-order derivative expression computed from the images, using the zero-crossings of the Laplacian or the zero-crossings of a non-linear differential expression. In various embodiments, the controller 140 uses Canny or Canny-Deriche edge detection.

If the controller 140 does not find an image within the predetermined distance from the location, then the controller 140 returns an error message to the user. If the controller 140 does find an image, then control continues to block 515 where the controller 140 determines the identity of the application, from among all the applications 144, that generates the image on the display device or that generates the window that comprises the image. Control then continues to block 520 where the controller 140 uses the image and identifier of the application that generates to the image to search for a matching record in the help repository 142 that comprises a matching image and a matching application identifier to the found image and identifier of the application that generates the found image within the predetermined distance from the location of the pointer 210. Using the example of FIGS. 2 and 3, the controller 140 finds the record 304 that comprises an image 320 that matches the image 204 that is within the predetermined distance of the radius of the circle 220 from the location of the pointer 210 and the identifier of the application that generates the image 204 matches the application identifier 322 in the record 304.

Control then continues to block 525 where the controller 140 determines whether the help repository 142 contains a record for the image and the found application identifier. The controller 140 makes the determination by comparing the current image to the images 320 in the help repository 142, finding a record comprising a matching image to the found image, reading the application identifier 322 from the same record, and comparing the application identifier 322 to the determined application identifier. If the determination at block 525 is true, then the help repository 142 contains a record for the image and the found application identifier that is assigned to the image, so control continues to block 530 where the controller 140 displays the help data and application identifier from the found record on the display device and prompts the user to enter a change to the help data. Control then continues to block 535 where the controller 140 receives new help data from the user and stores the new help data to the existing record for the image and application identifier in the help repository 142. Control then continues to block 599 where the logic of FIG. 5 returns.

If the determination at block 525 is false, then the help repository 142 does not contain a record for the image or does not contain a record for the found application identifier, so control continues to block 540 where the controller 140 displays the application identifier of the application that generated the image and prompts the user for new help data to be assigned to the image. Control then continues to block 545 where the controller 140 receives new help data from the user via the user interface device 121 and stores the new help data, the image, and the application identifier to a new record in the help repository 142. Control then continues to block 599 where the logic of FIG. 5 returns.

Figure 6:
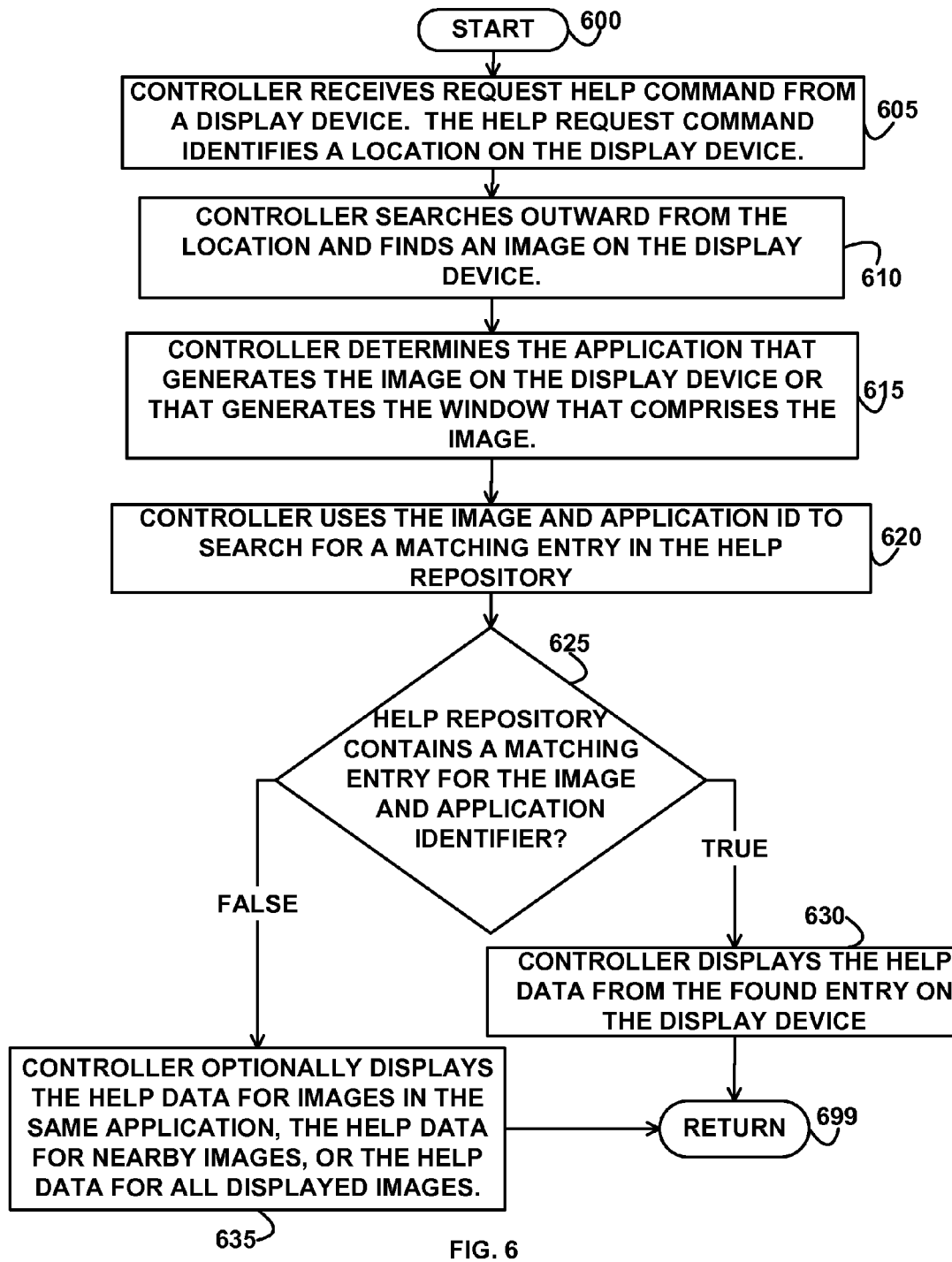
FIG. 6 depicts a flowchart of example processing for a request help command, according to an embodiment of the invention.

FIG. 6 depicts a flowchart of example processing for a request help command, according to an embodiment of the invention. Control begins at block 600. Control then continues to block 605 where the controller 140 receives a request help command from the user interface device 121. The request help command identifies or specifies a location on the display device that the user was pointing to when the controller 140 receives the command. The request help command requests that the controller 140 display help data for an image located within a predefined distance of the location where the user was pointing to on the display device when the command was received. In various embodiments, the user may initiate a request help command by selecting a button on a pointing device while the pointer 210 is positioned at the location on the display device, by touching the display device with a finger, other body part, or a stylus, via a voice command, or by selecting a menu option. In various embodiments, the controller 140 receives the predefined distance from the user or an administrator as option, receives the predefined distance from the user interface device 121, receives the predefined distance from the client computer 132 via the network 130, or calculates the predefined distance from the dimensions of the user interface device 121 and the size of the images displayed on the user interface device 121.

Control then continues to block 610 where the controller 140 searches outward from the location and determines whether an image exists within the predefined distance from the location. In various embodiments, the controller 140 uses edge-recognition, color changes, and shading variations in the search for an image, by finding the edges of the image where colors and/or shades change or are discontinuous from the background to the image, as previously described above.

If the controller 140 does not find an image within the predetermined distance from the location, then the controller 140 returns an error message to the user. If the controller 140 does find an image, then control continues to block 615 where the controller 140 determines the identity of the application, from among all applications 144, that generates the image on the display device or that generates the window that comprises the image. Control then continues to block 620 where the controller 140 uses the image and identifier of the application that generates to the image to search for a matching record in the help repository 142 that comprises a matching image and a matching application identifier to the found image and identifier of the application that generates the found image within the predetermined distance from the location of the pointer 210. Using the example of FIGS. 2 and 3, the controller 140 finds the record 304 that comprises an image 320 that matches the image 204 that is within the predetermined distance of the radius of the circle 220 from the location of the pointer 210 and the identifier of the application that generates the image 204 matches the application identifier 322 in the record 304.

Control then continues to block 625 where the controller 140 determines whether the help repository 142 contains a record for the image and the found application identifier. The controller 140 makes the determination by comparing the current image to the images 320 in the help repository 142, finding a record comprising a matching image to the found image, reading the application identifier 322 from the same record, and comparing the application identifier 322 to the determined application identifier. If the determination at block 625 is true, then the help repository 142 contains a record for the image and the found application identifier that is assigned to the image, so control continues to block 630 where the controller 140 displays the help data and application identifier from the found record on the display device. Control then continues to block 699 where the logic of FIG. 6 returns.

If the determination at block 625 is false, then the help repository 142 does not contain a record for the image or does not contain a record for the found application identifier, so control continues to block 635 where the controller 140 optionally displays the help data for all images generated by the same application, displays the help data for images that are within a threshold distance of the image determined at block 610, and/or displays the help data for all images that are displayed on the display device by all applications 144. Control then continues to block 699 where the logic of FIG. 6 returns.

In various embodiments, the logic of FIGS. 4, 5, and 6 execute asynchronously, concurrently, or simultaneously on the same or different processors using multi-threading, multi-tasking, or multi-programming techniques.

In this way, an embodiment of the invention provides help for any or all applications 144, where the help was not necessarily provided by the applications 144 themselves.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
providing a controller for providing help for a plurality of applications, wherein the controller is different from all of the plurality of applications;

receiving, via the controller, a command;

identifying a location that a user was pointing to on a display device when the command was received by the controller;

finding on the display device, via the controller, a first image within a predefined distance of the location where the user was pointing to on the display device when the command was received;

determining, via the controller; an identity of an application that generated the first image from among the plurality of applications, wherein the determining the identity of the application that generated the first image from among the plurality of applications further comprises determining the identity of the application that generated a window in which the first image is displayed;

searching, via the controller, for help data based upon the identity of the application that generated the first image and based on the first image;

displaying, via the controller, the help data if the searching finds the help data assigned to the first image and the application that generated the first image, wherein the displaying the help data if the searching finds the help data assigned to the first image and the application that generated the first image further comprises if a matching image is found in a help repository that matches the first image and the matching image is assigned an application identifier that matches the application that generated the first image, displaying the help data, and if the matching is not found that matches the first image in the help repository, displaying help data for a second image that is within a predefined distance from the first image on the display device.

2. The method of claim 1, wherein the displaying the help data if the searching finds the help data assigned to the first image and the application that generated the first image further comprises:

if the matching image is found in the help repository that matches the first image and the matching image is assigned the application identifier that matches the application that generated the first image, displaying the help data, prompting for new help data, and assigning the new help data to the matching image and the application identifier that matches the application that generated the first image in the help repository.

3. The method of claim 1, further comprising:

if the matching image is not found that matches the first image in the help repository, displaying help data for all images generated by the application that generated the first image.

4. The method of claim 1, further comprising:

if the matching image is not found that matches the first image in the help repository, prompting the user for new help data, storing the first image in the help repository, and assigning the new help data to the first image and the application identifier that matches the application that generated the first image in the help repository.

5. The method of claim 4, further comprising:

if the matching image is found in the help repository that matches the first image and the matching image is assigned an application identifier that does not match the application that generated the first image, refraining from displaying the help data, prompting the user for new help data, and assigning the new help data to the matching image and then application identifier that matches the application that generated the first image in the help repository.

6. The method of claim 1, further comprising:

prompting for a plurality of new help data for a plurality of images generated by the plurality of the applications that are not already assigned help data; and assigning the plurality of new help data to the plurality of images and the plurality of applications that generate the plurality of images in a help repository.

7. A computer-readable storage medium encoded with instructions, wherein the instructions when executed comprise:

providing a controller for providing help for a plurality of applications, wherein the controller is different from all of the plurality of applications;

receiving, via the controller, a command;

identifying a location that a user was pointing to on a display device when the command was received by the controller;

finding on the display device, via the controller, a first image within a predefined distance of the location where the user was pointing to on the display device when the command was received;

determining, via the controller; an identity of an application that generated the first image from among the plurality of applications, wherein the determining the identity of the application that generated the first image from among the plurality of applications further comprises determining the identity of the application that generated a window in which the first image is displayed;

searching, via the controller, for help data based upon the identity of the application that generated the first image and based on the first image;

displaying, via the controller, the help data if the searching finds the help data assigned to the first image and the application that generated the first image, wherein the displaying the help data if the searching finds the help data assigned to the first image and the application that generated the first image further comprises if a matching image is found in a help repository that matches the first image and the matching image is assigned an application identifier that matches the application that generated the first image, displaying the help data; and if the matching is not found that matches the first image in the help repository, displaying help data for a second image that is within a predefined distance from the first image on the display device.

8. The computer-readable storage medium of claim 7, wherein the displaying the help data if the searching finds the help data assigned to the first image and the application that generated the first image further comprises:

if the matching image is found in the help repository that matches the first image and the matching image is assigned the application identifier that matches the application that generated the first image, displaying the help data, prompting for new help data, and assigning the new help data to the matching image and the application identifier that matches the application that generated the first image in the help repository.

9. The computer-readable storage medium of claim 7, further comprising:

if the matching image is not found that matches the first image in the help repository, displaying help data for all images generated by the application that generated the first image.

10. The computer-readable storage medium of claim 7, further comprising:

if the matching image is not found that matches the first image in the help repository, prompting the user for new help data, storing the first image in the help repository, and assigning the new help data to the first image and the application identifier that matches the application that generated the first image in the help repository; and if the matching image is found in the help repository that matches the first image and the matching image is assigned an application identifier that does not match the application that generated the first image, refraining from displaying the help data, prompting the user for new help data, and assigning the new help data to the matching image and then application identifier that matches the application that generated the first image in the help repository.

11. The computer-readable storage medium of claim 7, further comprising:

prompting for a plurality of new help data for a plurality of images generated by the plurality of the applications that are not already assigned help data; and assigning the plurality of new help data to the plurality of images and the plurality of applications that generate the plurality of images in the help repository.

12. A computer system comprising:

a processor; and memory communicatively coupled to the processor, wherein the memory is encoded with instructions, wherein the instructions when executed by the processor comprise providing a controller for providing help for a plurality of applications, wherein the controller is different from all of the plurality of applications, receiving, via the controller, a command, identifying a location that a user was pointing to on a display device when the command was received by the controller, finding on the display device, via the controller, a first image within a predefined distance of the location where the user was pointing to on the display device when the command was received, determining, via the controller, an identity of an application that generated the first image from among the plurality of applications, wherein the determining the identity of the application that generated the first image from among the plurality of applications further comprises determining the identity of the application that generated a window in which the first image is displayed, searching, via the controller, for help data based upon the identity of the application that generated the first image and based on the first image, displaying, via the controller, the help data if the searching finds the help data assigned to the first image and the application that generated the first image, wherein the displaying the help data if the searching finds the help data assigned to the first image and the application that generated the first image further comprises if a matching image is found in a help repository that matches the first image and the matching image is assigned an application identifier that matches the application that generated the first image, displaying the help data, and if the matching image is not found that matches the first image in the help repository, displaying help data for a second image that is within a predefined distance from the first image on the display device.

13. The computer system of claim 12, wherein the displaying the help data if the searching finds the help data assigned to the first image and the application that generated the first image further comprises:

if the matching image is found in the help repository that matches the first image and the matching image is assigned the application identifier that matches the application that generated the first image, displaying the help data, prompting for new help data, and assigning the new help data to the matching image and the application identifier that matches the application that generated the first image in the help repository.

14. The computer system of claim 12, wherein the instructions further comprise:

if the matching image is not found that matches the first image in the help repository, displaying help data for all images generated by the application that generated the first image.

15. The computer system of claim 12, wherein the instructions further comprise:

if the matching image is not found that matches the first image in the help repository, prompting the user for new help data, storing the first image in the help repository, and assigning the new help data to the first image and the application identifier that matches the application that generated the first image in the help repository; and if the matching image is found in the help repository that matches the first image and the matching image is assigned an application identifier that does not match the application that generated the first image, refraining from displaying the help data, prompting the user for new help data, and assigning the new help data to the matching image and then application identifier that matches the application that generated the first image in the help repository.

16. The computer system of claim 12, wherein the instructions further comprise:

prompting for a plurality of new help data for a plurality of images generated by the plurality of the applications that are not already assigned help data; and assigning the plurality of new help data to the plurality of images and the plurality of applications that generate the plurality of images in the help repository.

\* \* \* \* \*